United States Patent [19]
Nakanishi

[11] Patent Number: 5,164,629
[45] Date of Patent: Nov. 17, 1992

[54] VIBRATION WAVE DRIVEN MOTOR

[75] Inventor: Toru Nakanishi, Yokohama, Japan

[73] Assignee: Canon Kabushiki Kaisha, Tokyo, Japan

[21] Appl. No.: 663,427

[22] Filed: Mar. 1, 1991

[30] Foreign Application Priority Data

Mar. 1, 1990 [JP] Japan .................................. 2-50203

[51] Int. Cl.$^5$ ............................................. H01L 41/08
[52] U.S. Cl. ........................................................ 310/323
[58] Field of Search ................................ 310/323, 328

[56] References Cited

U.S. PATENT DOCUMENTS

| | | |
|---|---|---|
| 4,937,488 | 6/1990 | Fujie ..................................... 310/323 |
| 4,983,874 | 1/1991 | Yamaguchi ........................... 310/323 |

FOREIGN PATENT DOCUMENTS

| | | |
|---|---|---|
| 63-73887 | 4/1988 | Japan . |
| 0209484 | 8/1988 | Japan .................................. 310/323 |
| 0262074 | 10/1988 | Japan ................................ 310/323 |
| 0265575 | 11/1988 | Japan ................................ 310/323 |
| 0039272 | 2/1989 | Japan .................................. 310/323 |
| 0315270 | 12/1989 | Japan ................................ 310/323 |
| 0007876 | 1/1990 | Japan .................................. 310/323 |
| 0041674 | 2/1990 | Japan .................................. 310/323 |
| 0079782 | 3/1990 | Japan .................................. 310/323 |
| 0303375 | 12/1990 | Japan ................................ 310/323 |

*Primary Examiner*—Mark O. Budd
*Attorney, Agent, or Firm*—Fitzpatrick, Cella, Harper & Scinto

[57] ABSTRACT

A vibration wave driven motor that permits obtaining of rotation output from the output member positioned at the center of rotation. The ring-shaped vibration member for forming traveling vibration waves is fixed to the output member. At the same time, the movable member installed on the output member is press-fit to the vibration member by means of pressurizing and friction driving of the movable member is created by traveling vibration waves generated on the vibration member. The vibration wave driven motor includes plural bearing members for supporting the output member in free rotation style provided on same member.

11 Claims, 4 Drawing Sheets

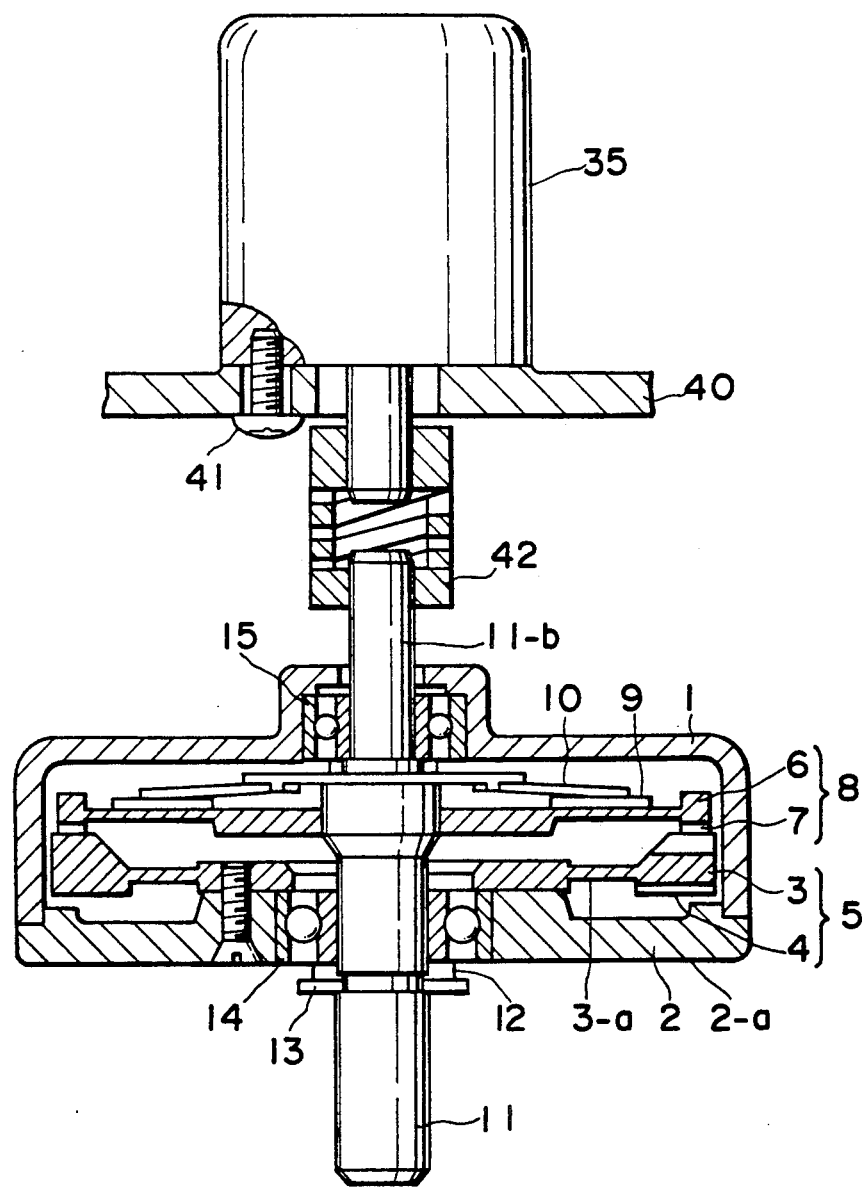

VIBRATION WAVE DRIVEN MOTOR

BACKGROUND OF THE INVENTION

1. Field of the Invention

This invention relates to a vibration wave driven motor which produces a friction drive of movable member with traveling vibration wave.

2. Related Background Art

Suggestions regarding the structure of the vibration wave driven motor which utilizes flex vibration of piezo-electric element is revealed in the Japanese Laid-Open Patent Application No. 63-73887 and others.

Said suggestions offer the following motors:
1) a small-sized and compact vibration wave driven motor;
2) a vibration wave driven motor with excellent heat radiating effects;
3) a vibration wave driven motor with high operating efficiency; and,
4) a vibration wave driven motor with easy to adjust pressurizing force.

Since the driving principle of the vibration wave driven motor is publicly known, detailed explanations are omitted but brief explanations are given as follows.

On the vibration wave driven motor, a piezo-electric element used as an electro-mechanical energy conversion element is bonded with adhesive to one side of a metallic resilient member formed, for example, into a ring shape. By applying AC voltage with respectively differing phases to two piezo electric element groups for driving, formed on said piezo-electric element, two types of standing waves are excited on the resilient member. By composing these standing waves, traveling vibration waves, which are flex vibrations, are generated.

On the other hand, against the other side of the resilient member, a member part in the form, for example, of a ring is press-contact by means of pressurizing with a spring, etc. This member part is moved by friction of traveling waves generated on the resilient member or the resilient member itself is moved.

Explanations are made as follows regarding a conventional example with the aid of FIG. 5.

2 is a motor cover and 1 is a motor case. A resilient member 3, for example, structured with stainless steel is attached with a piezo-electric element 4 and these items configure a stator 5 (vibration member). The stator structure permits conduction and dispersion of the heat resulting from motor temperature rise due to heating of the stator 5 to the case 1 by way of the cover 2.

8 is a rotor structured by fitting a slider 7 to a ring 6. This rotor 8 is pushed against the stator 5 via a rubber member 9 by means of the pressure force of a belleville spring 10. The rotor 8 is able to rotate integrally with a shaft 11. Since the pressure force is maintained by a snap ring 13 after selecting and properly adjusting the thickness of a shim 12, this pressure can be very easily adjusted. The shaft 11 is supported by bearings 14 and 15 mounted on the case 1 and the cover 2 respectively so as to allow free rotation.

FIG. 6 is the drawing of a conventional example that shows the installation status of an encoder device on a vibration wave driven motor.

35 is an encoder fixed on an encoder mounting plate 40 with a screw 41. The encoder device is connected to the shaft 11 of the vibration wave driven motor at a step section 11-b by a coupling 42.

On the above-mentioned conventional example, however, as the shaft 11 is supported by two sets of bearings 14 and 15 mounted on the bearing engagement sections formed on the case 1 and the cover 2 that are separate member parts from each other, the following defects occur.

1) Two bearing sections are configured as a separate member and due to the misalignment of the case 1 and the cover 2, the coaxiality at the bearing sections are increased. Therefore, tumbling of the rotation center of the shaft 11 supported by these bearing sections is caused.

Consequently, parallelism of the opposing surfaces between the rotor 8 fixed on the shaft 11 and the stator 5 fixed on the cover 2 becomes greater in value. To eliminate this defect, on the conventional example said parallelism errors tend to be absorbed by utilizing elasticity obtainable from the support structure of both stator 5 thin section 3-a and rotor 8. However, this attempt is not perfectly successful because it produces contact or wear on one side. Also, when "sharp ramp-up or ramp-down" which is a feature of the vibration wave driven motor occurs, a delay of deflection follow-up of the elastic structure of the rotor 8 and the stator 5 is observed. Further, the reaction force of deflection follow-up tends to create undesired stimulation resulting in adverse effects to the motor and degrading operation efficiency.

2) When perpendicularity is required between the shaft 11 and the mounting surface 2-a of the motor device (for instance, perpendicularity of less than 10 μm), the vibration wave driven motor can be operated by the direct coupling drive method which permits the motor to most effectively demonstrate its other operating feature of generating of high torque at low speed. In many applications of this direct coupling drive method, however, precise perpendicularity of the shaft against the driven section is required. On the other hand in the conventional example, it is difficult to improve the perpendicularity, as mentioned above, between the shaft 11 and the mounting surface 2-a. Consequently, such a defect makes it impossible to utilize this feature of the vibration wave driven motor.

3) As is evident from the fact that 70% of servo motors have encoders inside the motor, the need for such a built-in encoder is quite high. More particularly, when an encoder with high precision and excellent resolution is built in, judging from the characteristics of the encoder, an extremely high-level of positioning between the rotor in the encoder and stator detection portion and coaxiality or vibration accuracy with shaft 11 to which the rotor in the encoder is connected are required. As explained in the above section 2), accuracy improvement is apparently very difficult on the conventional example.

Further, at the structure which the encoder device 35 is connected by the coupling 42, the motor device including the encoder device 35 becomes quite large and makes it difficult to reduce the structural size.

As shown in FIG. 6, since the encoder device 35 is connected by the coupling 42, position detecting errors happen because of alignment errors by the coupling 42, and twisting errors and twisting vibration due to torsion rigidity lower than the shaft 11.

SUMMARY OF THE INVENTION

One aspect of this invention is to provide a vibration wave driven motor which obtains extremely high accuracy of perpendicularity at the output members, such as the shaft.

One aspect of this invention is to provide a vibration wave driven motor which can get the satisfactory results of position detection when the encoder is installed.

One aspect of this invention is to provide a vibration wave driven motor to that permits obtaining rotation output from the output member located at the center of rotation. For this purpose, the ring-shaped vibration member for forming traveling vibration waves is fixed to the output member. At the same time, the movable member installed on the output member is press-contacted to the vibration member by means of pressurizing and friction driving of the movable member is created by traveling vibration waves generated on the vibration member. The vibration wave driven motor is provided with plural bearing members mounted on the same member for supporting the output member in free rotation style.

Other aspects of this invention will be clarified by the following detailed explanations.

BRIEF DESCRIPTION OF THE DRAWINGS

FIG. 6 is a vertical cross-sectional diagram showing a conventional example with an encoder.

DETAILED DESCRIPTION OF THE PREFERRED EMBODIMENTS

Figure 1:
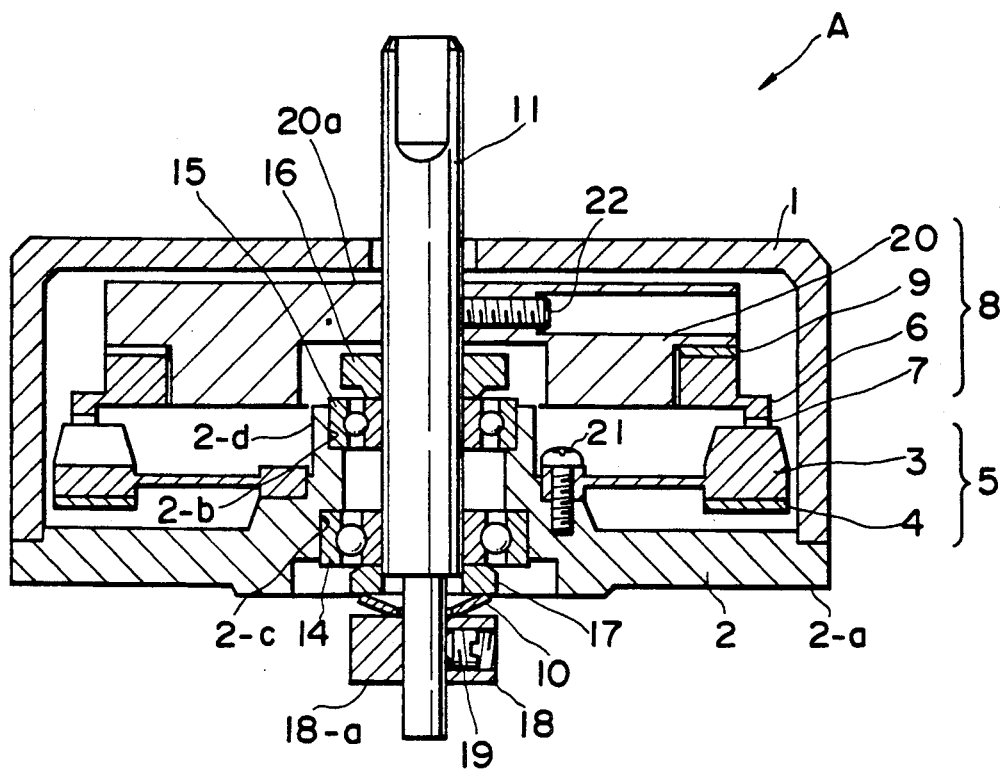
FIG. 1 is the vertical cross-sectional diagram showing an embodiment of the vibration wave driven motor covered by this invention.

FIG. 1 is a vertical cross-sectional diagram which shows an embodiment of the vibration wave driven motor according to the present invention.

Figure 5:
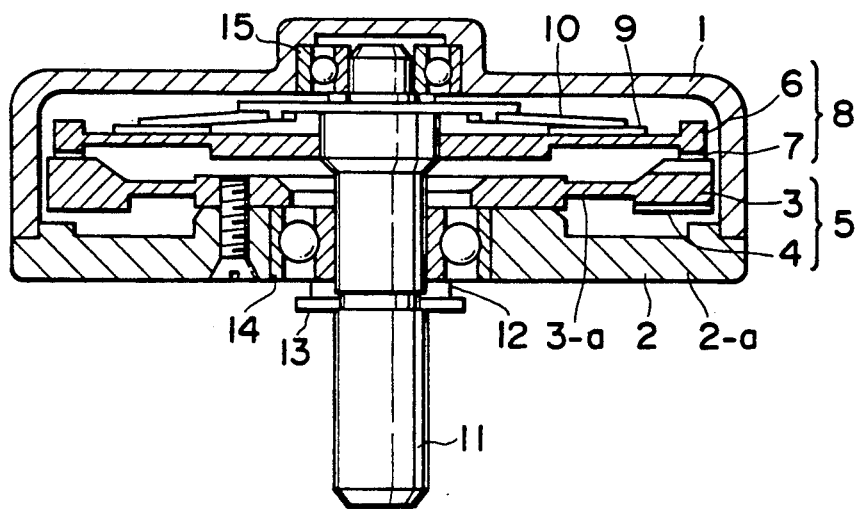
FIG. 5 is a vertical cross-sectional diagram showing a conventional vibration wave driven motor.

With regard to FIG. 1, explanations of member parts possessing functions identical to those of the conventional examples in FIGS. 5 and 6 are omitted by assigning the same code number.

1 is a motor case and 2 is a motor housing. Inside the space covered by the housing 2 and the case 1, a rotor 8 and a stator 5 are housed. A cylinder section 2-d is integrally formed at the center section of the housing 2. Ball bearings 14 and 15 are mounted on bearing engagement sections 2-b and 2-c which are formed integrally and coaxially at both edges and outer ends of this cylinder. Then, by those ball bearings 14 and 15, an output shaft 11 is supported in free rotation style and permitting vertical movement against the inner rings of ball bearings. Further, on the housing 2, a stator 5 with a piezo-electric element 4 attached to a resilient member 3 is installed with a screw 21.

A slider 7 is fixed to a ring 6 and the rotor 8 is structured with a rubber ring 9 inserted between this ring 6 and a support member 20.

A preload collar 17 which contacts the inner ring of the ball bearing 14 at the lower side and a spring 10 being pinched with a pressurizing boss 18 are warped by applying pressure to an edge surface 18-a of the pressurizing boss 18 and an edge surface 20-a of the support member 20. Then, by tightening respective securing screws 19 and 22, a preload is applied to the bearing 14 by spring force of the spring 10 and at the same time, the rotor 8 is caused to press-contact to the stator 5.

On the other hand, the ball bearing 15 receives preload from the preload collar 16 fixed to the output shaft 11. In other words, the case 1 performs merely as a cover to be mounted on the housing 2 and it possesses no function related to the bearings of the output shaft 11.

Figure 2:
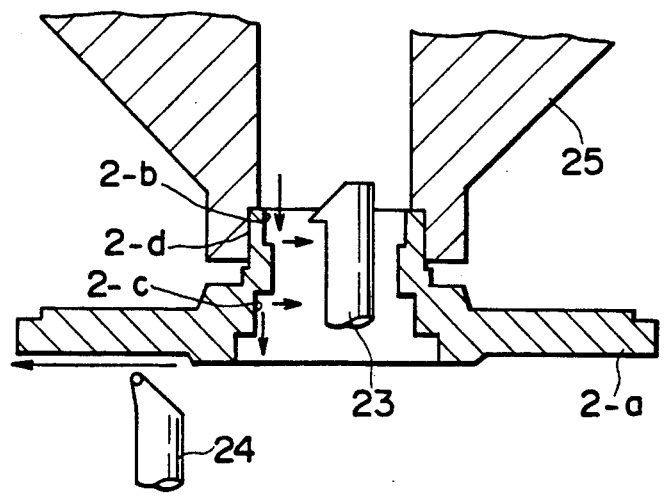
FIG. 2 is the explanatory diagram showing the processing method of the housing section of the motor.

By citing FIG. 2, explanations will be made concerning the example of the finish processing method for the housing 2 covered by this embodiment. 25 is a chuck of a lathe used for chucking the cylinder section 2-d of the housing 2. While rotating the housing 2, the bearing engagement sections 2-b and 2-c and the reference surface 2-a are subjected to continuous processing finish by using cutting blades 23 and 24.

By performing the above-mentioned method, it is possible to process perpendicularity to the axial line of the bearing engagement sections 2-b and 2-c against the reference surface 2-a to a high-accuracy level of about 1 $\mu$m. Then, two bearings 14 and 15 can be mounted on the bearing engagement sections 2-b and 2-c of the housing finished at a high-precision level. By mounting two bearings 14 and 15, due to the structure supported by the output shaft 11, extremely precise perpendicularity against the reference surface 2-a of motor can be realized.

Figure 3:
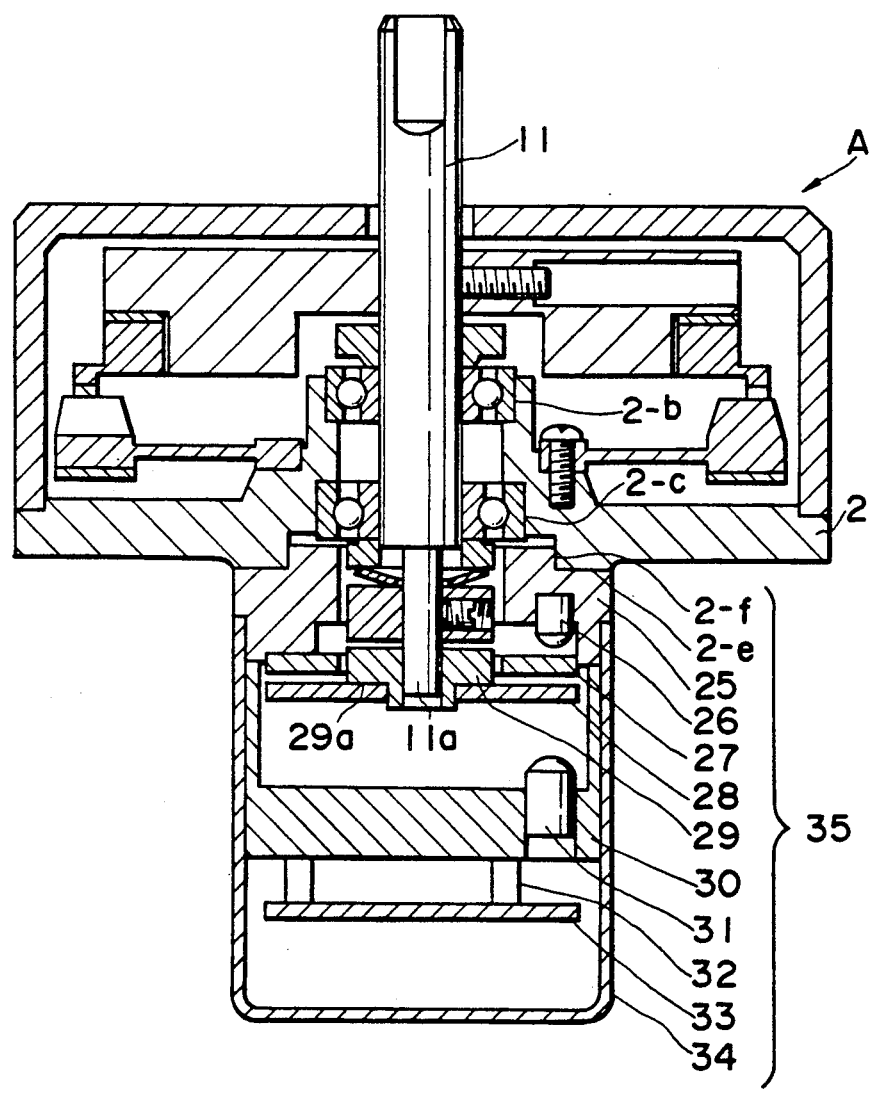
FIG. 3 indicates an embodiment of the vibration wave driven motor with an encoder installed.

FIG. 3 shows an example which assembles an optical encoder with the vibration wave driven motor shown in FIG. 1.

At a step portion 11-a of the output shaft 11, a chart base 29 is fixed. The mounting surface 29-a of the encoder chart 28 in this chart 29 is worked by assembled processing while driving the vibration wave driven motor A. Thus, high-precision processing against the output shaft 11 is achieved. Further, the encoder chart 28 is fixed on this mounting surface 29-a.

Mounting surfaces 2-e and 2-f of an encoder securing side member 25 of the housing 2 are processed simultaneously with the bearing engagement surfaces 2-b and 2-c. In other words, the cutting process similar to the example in FIG. 2 is applied to the bearing engagement sections and high-precision coaxial level and perpendicularity are obtained. 27 is an index chart attached on the securing side member 25, while 30, a mounting base of a light-emitting element 31, is also attached on the securing side member 25. The light from the light emitting element 31 penetrates through the index chart 27 and the chart 28 and reaches a light-receiving element 26 mounted on the securing side member 25. 33 is an amplifying and waveform reshaping circuit for the light-emitting element 31 and the light-receiving element 26. This circuit is mounted on the mounting base 30 by means of a spacer 32. An encoder case 34 protects the optical components and the circuit section of the encoder 35. The amplified and reshaped wave form signals are led into the external motor control circuit not shown in the figure through the signal line which is also not illustrated in the figure and then rotation of the motor is controlled.

In the embodiment depicted in FIG. 3, the encoder 35 is arranged outside the motor A. However this encoder 35 can be placed in the motor A interior and at the same time, the encoding method does not necessarily have to be the method according to the embodiment. Either an optical encoder of another type, such as a laser rotary encoder or non-optical type, are applicable.

Figure 4:
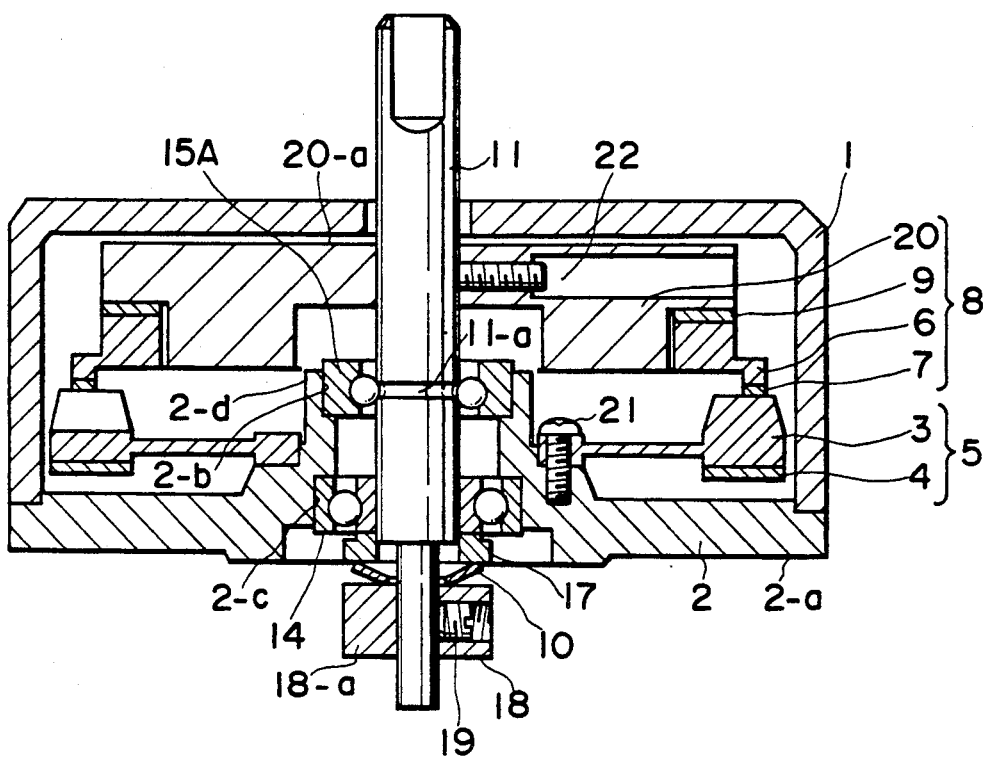
FIG. 4 is a vertical cross-sectional diagram showing another embodiment.

FIG. 4 shows another embodiment.

In this embodiment, by forming a inner race 11-a directly on the output shaft 11, an inner-side bearing A is used as a shaft integral type with assembled bearing. This shaft-integral bearing 15A adopts the structure that omits the bearing inner ring, which is free from accuracy errors of the inner ring and further precision upgrading of the output shaft becomes possible. Consequently, it becomes feasible to provide the vibration wave driven motor with precision higher than that of the embodiment of FIG. 1.

The preload collar 16 under the embodiment in FIG. 1 can also be omitted because, on the shaft integral bearing 15A, preload can be applied by the inner race 11-a. Further, under in each of the above-mentioned embodiments, although ball bearings are actually used, these ball bearings can be substituted with slide bearings or dynamic pressure/static pressure bearings. Further, magnetic bearings may be usable and combinations of these bearings are also satisfactory.

Further, inner-ring side rotation is adopted in said embodiments but outer ring rotation may be employed.

Additionally, it is permissible to perform assembled processing between the bearing engagement sections 2-b and 2-c and the motor reference surface 2-a during formation of the housing 2.

As explained up to this point, according to the subject invention, plural bearing members are provided on the same members and these bearing members are used to perform shaft supporting of the output member. By applying this method, extremely high-level precision of perpendicularlity of the output shaft conventionally not possible can be realized. As a result, for the member to be driven in high precision, it becomes possible to provide a vibration wave driven with high accuracy and high resolution.

Further, by realizing precision improvement on the output member, it becomes possible to provide a vibration wave driven motor with a built-in encoder possessing excellent accuracy and outstanding resolution.

Additionally, by configuring the bearing sections into the same members, adoption of unit structure of the baring sections becomes possible and the merits improved assembly can be realized.

Conventionally the vibration wave driven motor and encoder device are connected by coupling, but thanks to assembling the encoder device into the output shaft of the vibration wave driven motor, misalignment errors resulting from coupling accuracy differences can be reduced. At the same time, while torsion rigidity of coupling is lower than that of the output shaft and twisting errors or twisting vibration is caused, such problems are equally removed and more precise position detection and control can be realized.

What is claimed is:

1. A vibration wave driven motor, comprising:

a vibration member for generating a travelling vibration wave therein in response to an applied electrical signal;

a movable member provided in contact with said vibration member for receiving the vibration wave as a driving force;

motor housing means including a mounting surface forming a reference surface and engaging surfaces provided substantially orthogonal to said mounting surface;

an output member functionally engaged with said movable member;

a plurality of bearing members provided on said engaging surfaces, said bearing members rotatably supporting said output member; and position detection means provided in contact with said mounting surface and engaging said output member for detecting a rotational positional of said output member.

2. A motor according to claim 1, wherein said housing means includes a portion for supporting said vibration member.

3. A motor according to claim 1, wherein said movable member is a ring shaped rotor.

4. A motor according to claim 1, wherein said engaging surfaces include respective cylindrical portions for installing said plurality of bearing member.

5. A motor according to claim 4, wherein the cylindrical portions have surfaces for installing said plurality of bearing members provided along the lengthwise direction of said output member.

6. A vibration wave driven motor, comprising:

a vibration member for generating a vibration wave therein in response to an applied electrical signal;

a contact member provided in contact with said vibration member for receiving the vibration wave;

motor housing means including a mounting surface forming a reference surface and engaging surfaces provided substantially orthogonal to said mounting surface;

an output member which rotates in accordance with the relative movement between said vibration member and said contact member caused by said vibration wave;

a plurality of bearing members provided on said engaging surfaces, said bearing members rotatably supporting said output member; and position detection means, provided in contact with said mounting surface and engaging said output member, for detecting a rotational position of said output member.

7. A motor according to claim 6, wherein said motor housing means includes a portion for supporting said vibration member.

8. A motor according to claim 6, wherein said contact member comprises a ring shaped rotor.

9. A motor according to claim 7, wherein said engaging surfaces have respective cylindrical shapes.

10. A motor according to claim 6, wherein said bearing members are the ball bearings.

11. A motor according to claim 6, wherein said position detection means includes an optical encoder.

* * * * *

UNITED STATES PATENT AND TRADEMARK OFFICE
CERTIFICATE OF CORRECTION

PATENT NO. : 5,164,629
DATED : November 17, 1992
INVENTOR(S) : NAKANISHI

It is certified that error appears in the above-identified patent and that said Letters Patent is hereby corrected as shown below:

COLUMN 6

Line 18 "positional" should read --position--.

Signed and Sealed this

Twenty-third Day of November, 1993

Attest:

BRUCE LEHMAN

*Attesting Officer*   *Commissioner of Patents and Trademarks*